(12) United States Patent
Khankhel

(10) Patent No.: US 7,336,612 B1
(45) Date of Patent: Feb. 26, 2008

(54) SWITCHING SYSTEM FOR TELECOMMUNICATION NETWORKS

(75) Inventor: Saeeda Khankhel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 750 days.

(21) Appl. No.: 09/916,406

(22) Filed: Jul. 27, 2001

(51) Int. Cl.
*H04L 12/56* (2006.01)

(52) U.S. Cl. .................. 370/237; 370/411; 370/414

(58) Field of Classification Search ............. 370/230, 370/236, 238, 395.6, 386, 388, 389, 390, 370/411–418, 237, 432
See application file for complete search history.

(56) References Cited

U.S. PATENT DOCUMENTS

| | | | | |
|---|---|---|---|---|
| 4,516,238 A | * | 5/1985 | Huang et al. | 370/411 |
| 4,542,497 A | * | 9/1985 | Huang et al. | 370/411 |
| 4,813,038 A | * | 3/1989 | Lee | 370/390 |
| 5,287,346 A | * | 2/1994 | Bianchini et al. | 370/390 |
| RE34,811 E | * | 12/1994 | Eng et al. | 370/355 |
| 5,440,553 A | * | 8/1995 | Widjaja et al. | 370/411 |
| 5,687,324 A | * | 11/1997 | Green et al. | 370/414 |
| 5,805,589 A | * | 9/1998 | Hochschild et al. | 370/389 |
| 5,856,977 A | * | 1/1999 | Yang et al. | 370/395.72 |
| 5,862,128 A | * | 1/1999 | Cooperman et al. | 370/236 |
| 6,686,906 B2 | * | 2/2004 | Salminen et al. | 345/169 |

OTHER PUBLICATIONS

Joseph Y. Hui and Edward Arthurs, "A Broadband Packet Switch for Integrated Transport", IEEE, 1987.*

Ra'ed Y. Awdeh and H.T. Mouftah, "Survey of ATM Switch Architectures," 1995, pp. 47-93, Computer Networks and ISDN Systems.

J. Giacopelli, et al, "Sunshine: A High-Performance Self-Routing Broadband Packet Switch Architecture," Oct. 1991, pp. 1289-1298, IEEE J. On Selected Areas in Communications, vol. 9.

A. Huang and S. Knauer, "Starlite: A wideband digital switch," 1984, pp. 121-125, Proc. IEEE GLOBECOM.

Dr. M. Toy, "ATM Development and Applications," 1996, pp. 35-46, Lucent Technologies.

Y. Yu-Shuan, M. Hluchyj, A. Acampora, "The Knockout Switch," Oct. 1987, pp. 1274-1283, Proc. IEEE J. On Selected Areas in Communications.

Saeeda Khankhel, *Moonlight—A High Performance Broadband ATM Switch Architecture*, a Thesis presented to the Faculty of Graduate School, University of Missouri—Columbia (Aug. 2000).

* cited by examiner

*Primary Examiner*—Doris H. To
*Assistant Examiner*—Habte Mered

(57) ABSTRACT

The present invention is directed to a high performance broadband ATM switching system comprised of concentrator, non-recirculating sort-trap and queuing stages. The concentrator stage concentrates cells entering the switch by discarding idle inputs thereto. Cells arriving at the non-recirculating sort-trap stage during a time slot are sorted based upon destination address and priority. Cells having a unique address for the time slot are placed in a corresponding output queue while cells having non-unique destination addresses are re-routed to a trap buffer which ages the cell until a subsequent time slot in which the destination address is unique.

24 Claims, 4 Drawing Sheets

SWITCHING SYSTEM FOR TELECOMMUNICATION NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a switching system for telecommunication networks. The switching system achieves enhanced throughput by incorporating a three-stage, non-recirculating configuration thereinto.

BACKGROUND OF THE INVENTION

Over the years, switching systems having a wide variety of architectures have been developed for use in telecommunication networks. A "crossbar" switch is a single-stage, single-path, non-blocking switch. Broadly speaking, an N by N crossbar switch consists of a square array of $N^2$ individually operated crosspoints, one for each input-output pair, having two possible states—cross (default) and bar. For such an N by N crossbar switch, a connection between input port i and output port j is established by setting the (i, j) crosspoint switch to the bar state.

Crossbar switches have always been attractive to switch designers because they are non-blocking, relatively simple in architecture and modular in nature. Originally developed for circuit switching, many asynchronous transfer mode ("ATM") switching systems are either based on the crossbar switch or use it as their basic building block. Crossbar switches do, however, have several drawbacks. First and foremost, crossbar switches have a square growth of complexity. As a result, they do not scale well to large sizes. Additionally, different input-output pairs of a crossbar switch may have different transit delays. As a result, a fairness problem arises when the crossbar switch is operated in a self-routing mode. Finally, despite being non-blocking, crossbar switches suffer from output blocking. As a result, buffers are oftentimes necessary to reduce cell losses in ATM switching systems based upon crossbar switch technology.

Other ATM switching systems are based upon a network architecture commonly referred to as a "Banyan" network. Besides being self-routing, Banyan network-based switching systems are modular, generally have the same latency for all input-output pairs, support synchronous and asynchronous modes of operation, are suitable for very large scale implementation ("VLSI") implementations, and enjoy reduced complexity in comparison to the crossbar switch. However, while the Banyan network's path-uniqueness characteristic preserves cell sequencing in Banyan network-based switching systems, it results in the switching systems being internally blocking. Thus, while the Banyan network-based switching systems and the crossbar switch-based switching systems both suffer from degraded performance when the size of the switching system is increased, the degradation is more significant for the Banyan network-based switching systems because the crossbar switching system suffers only from output blocking while the Banyan network-based switching system suffers from both output blocking and an internal blocking which increases in severity with the number of stages therein.

A Banyan network-based switching system may become non-blocking if incoming cells are ordered according to their output port addresses and concentrated to remove any gaps between active inputs if output conflicts do not exist. A network architecture which, if incorporated into a Banyan network-based switching system, that can perform distributed parallel sorting is generally referred to as a "Batcher" sorter network. An N by N Batcher sorter network can be constructed using $\log_2(\log_2 N+1)/2$ stages, each with N/2 sorting elements, for example, binary comparators. A Batcher sorter network can sort an arbitrary set of active cells based upon their output port addresses and group them consecutively at either the bottom or top of its output ports.

An ATM switching system 150 which combine the aforedescribed Batcher sorter and Banyan networks is illustrated in FIG. 1a. The ATM switching system 150, commonly referred to as a "Sunshine" switching system, is comprised of a Batcher sorter network 152, trap network 154, a concentrator 156, a selector 158, a recirculating buffer 160, a parallel array of Banyan networks 162-1 through 162-N and a parallel array of output buffers 164-1 through 164-N. Cells input the ATM switching system 150 first enter the Batcher sorter network 152. The Batcher sorter network 152 arranges the cells in order of destination address and priority. The sorted cells proceed to the trap network 154 for resolution of output port contention. More specifically, the trap network 154 resolves output port contention by selecting the k highest priority cells present for each destination address within a time slot for routing to the parallel array of Banyan networks 162-1 through 162-N. Any excess cells for each destination address are selected for routing to the recirculation buffer 160 from those to be routed to the parallel array of Banyan networks 162-1 through 162-N and the selector 158 selectively directs the separated cells to either the recirculation buffer 160 or the parallel array of Banyan networks 162-1 through 162-N as appropriate.

The parallel array of k Banyan networks 162-1 through 162-N provides k independent paths for cells to access the output buffers 164-1 through 164-N. Thus, as many as k cells may request a single destination address in a single time slot. If more than k cells request the same destination address, the excess cells are instead directed into the recirculating buffer 160. There, the excess cells are held until the next time slot and then resubmitted to the Batcher sorter network 152. Thus, ATM switching system 150 recirculates excess cells requesting the same address and must dedicate a number of input ports for recirculating cells. Accordingly, while the ATM switching system 150 can handle k cells requesting the same destination address, once the number of cells requesting that destination address exceeds k, performance of the ATM switching system 150 begins to suffer. Finally, because the ATM switching system 150 cannot be readily partitioned into integrated circuits, its commercial applicability is relatively limited.

Another ATM switching system 166 which incorporates a Batcher sorter network, here, without an associated parallel array of Banyan networks, is illustrated in FIG. 1b. The ATM switching system 166, commonly referred to as a "Starlite" switching system, includes a concentrator 168, a Batcher sorter network 170, a trap network 172, a recirculation buffer 174 and an expander 176. For the ATM switching system 166, cells arriving at the Batcher sorter network 170 within a time slot are sorted based upon destination address. The outputs of the Batcher sorter network 170 are fed into the trap network 172 in ascending order. The trap network 172 detects plural cells having the same destination address and allows only one of the plural cells destined to the same output port to be admitted to the expander 176. The remaining cells destined to that output port are recycled back to the Batcher sorter network 170 through the recirculation buffer 174. While the ATM switching system 166 suffers from a number of deficiencies, one of the more glaring of such deficiencies is that, in order to reduce cell loss within the recirculation buffer 174 a substantial fraction of the input ports of the Batcher sorter network 170 must be dedicated for cells being recirculated from the trap network 172 via the recirculating buffer 174. In the absence of such a need, these input ports would instead be dedicated to the concentrator 168. Thus, because of the need to dedicate a substantial number of ports to the recirculation buffer 174, the probability of cell loss within the concentrator 168 increases and the overall utilization rate of the ATM switching system 166 decreases substantially.

This invention improves on current switching systems such as the aforementioned Starlite and Sunshine switching systems by providing the advantages of a higher performance switching system without need of relatively complex hardware configurations therefor.

SUMMARY OF THE INVENTION

The present invention is directed to a multi-stage switching system for a telecommunications network. In various embodiments thereof, the multi-stage switching system may include concentrator, non-recirculating sort-trap, and/or queuing stages and, if multi-casting is desired, a broadcast network. The concentrator stage concentrates cells entering the switching system by discarding idle inputs. The non-recirculating sort-trap stage, which may include a Batcher sorter as a component thereof, places each cell having a unique destination address and arriving, at the non-recirculating sort-trap stage, in a first time slot, onto a selected output while aging those arriving cells having a non-unique destination address. The queuing stage buffers cells having a common destination address to be output the switching system via output ports thereof. Finally, the broadcast network, which is typically placed on the input side of the no-recirculating sort-trap stage copies data from selected ones of a plurality of source cells to selected ones of a plurality of empty copy cells to produce copies of the source cells for broadcast to multiple destination addresses.

In one aspect thereof, the non-recirculating sort-trap stage includes sort and non-recirculating trap substages. Within the sort substage, cells arriving in a time slot are sorted based upon destination address and, for common destination addresses, priority. Next, within the non-recirculating trap substage, the cells having a unique destination address are placed on a selected one of the outputs thereof while the cells having a non-unique destination address are aged until a subsequent time slot during which the destination address for that cell becomes unique. The aged cell is then placed on a selected output of the non-recirculating trap substage. In various further aspects thereof, a "unique" destination address may be, for plural cells having a common destination address, that cell which has the highest priority among the plural cells.

DETAILED DESCRIPTION OF THE INVENTION

Figure 2:
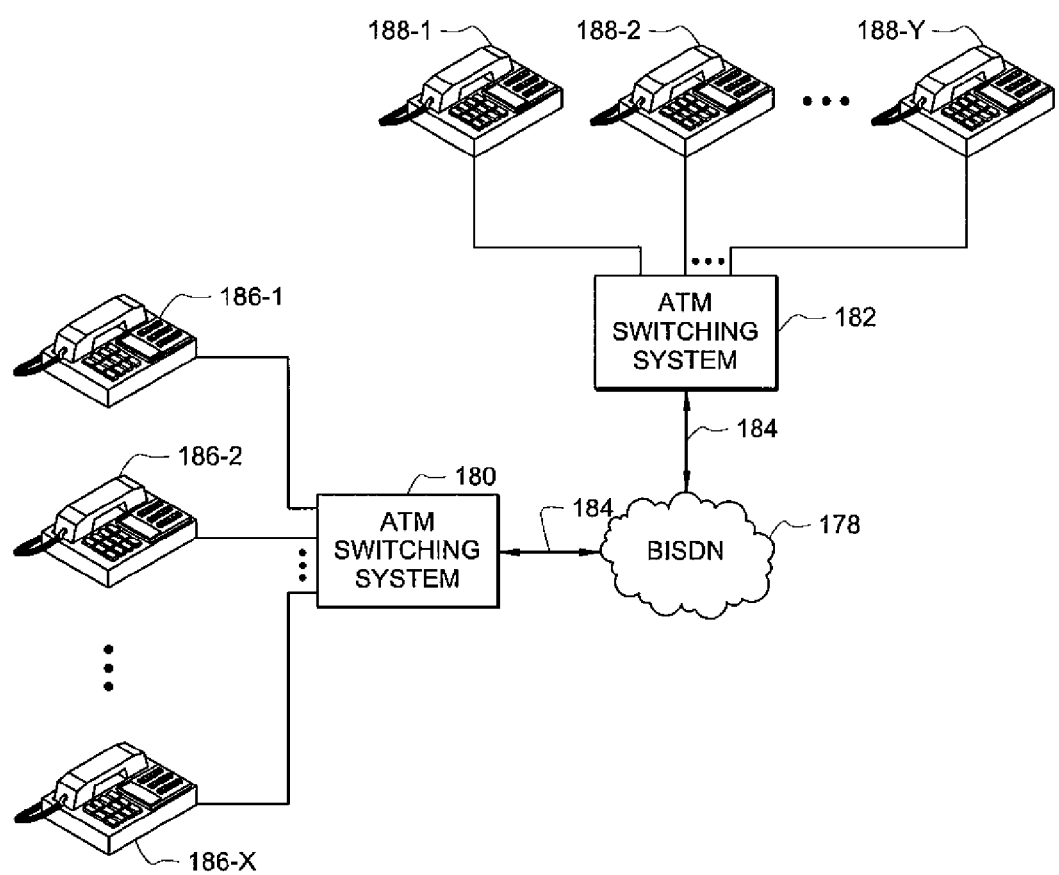
FIG. 2 is a telecommunications network incorporating an ATM switching system constructed in accordance with the teachings of the present invention.

Referring now to FIG. 2, a telecommunications network 178 incorporating a switching system 180 constructed in accordance with the teachings of the present invention will now be described in greater detail. As disclosed herein, the telecommunications network 178 is a broadband integrated data services network ("BIDSN"), a telecommunications network having a network architecture which utilizes asynchronous transfer mode ("ATM") as its communication protocol. Of course, the present disclosure of the telecommunications network 178 as a BIDSN is purely by way of example and it is fully contemplated that the telecommunications network may be any broadband or other telecommunication network utilizing the ATM communication protocol. For example, the telecommunication network may be a private ATM network. Furthermore, the ATM telecommunication network may be configured as either a connection-oriented network service ("CONS") packet switched network or a connectionless network service ("CLNS") packet switched network. In turn, the CONS ATM telecommunication network may be operated using either permanent virtual connections ("PVCs") or switched virtual connections ("SVCs").

Figure 1A:
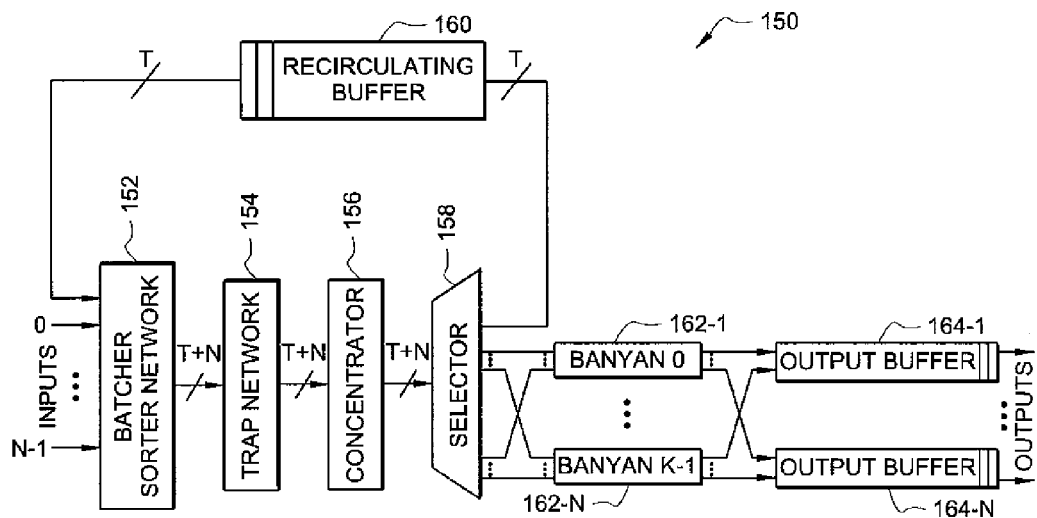
FIG. 1a is a block diagram of a Sunshine switching system, an ATM switching system which incorporates a Batcher-Banyan network
Figure 1B:
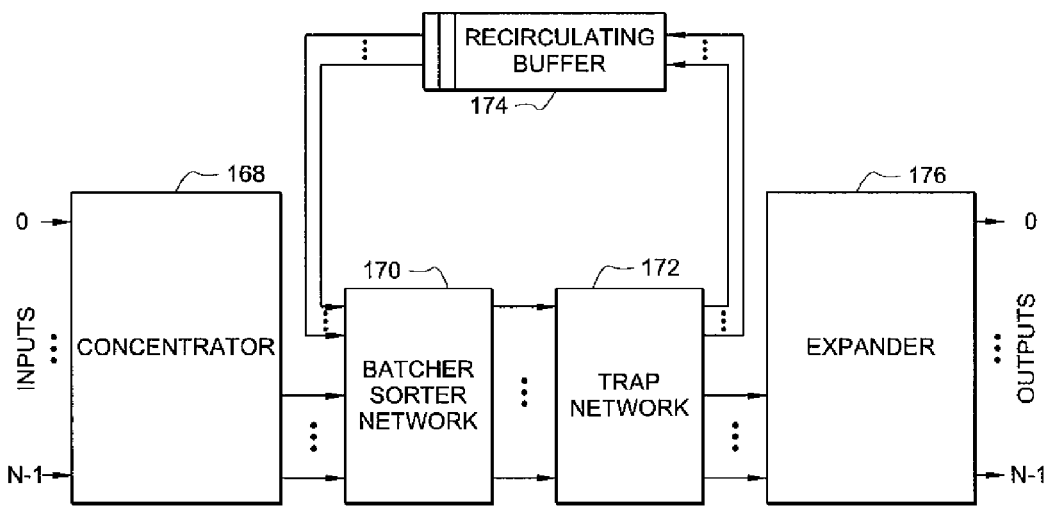
FIG. 1b is a block diagram of a Starlite switching system, an ATM switching system which incorporates a Batcher sorter network.

First and second ATM switching systems 180 and 182 are coupled to the telecommunication network 178 by an ATM switching fabric 184. Each of the first and second ATM switching systems 180 and 182 provide telecommunication services to plural end terminals. For example, the first ATM switching system 180 provides telecommunication services to end terminals 186-1 through 186-X while the second ATM switching system 184 provides telecommunication services to end terminals 188-1 through 188-Y. Of course, the disclosure of the first and second switching systems 178 and 180 as ATM switching systems is purely exemplary and it is fully contemplated that, in alternate embodiments thereof, the first and second switching systems 178 and 180 may instead be configured to employ any one of a multitude of other packet switching protocols currently in use. Furthermore, while in the embodiment of the invention disclosed in FIG. 1, the end terminals 186-1 through 186-X and 188-1 through 188-Y are all configured as voice terminals, it should be clearly understood that the end terminals 186-1 through 186-X and 188-1 through 188-Y may instead all be configured as voice, data, video, or multimedia terminals and/or some combination thereof. Finally, it should be fully understood that, as illustrated in FIG. 1, the telecommunications network 178 has been greatly simplified and that various components thereof, for example, a router to which the first ATM switching system 180 would direct internet protocol ("IP") traffic, a frame switch to which the first ATM switching system 180 would direct frame-relay traffic and a voice/data gateway to which the first ATM switching system 180 would direct voice-over-ATM traffic, have all been omitted for ease of description.

Figure 3A:
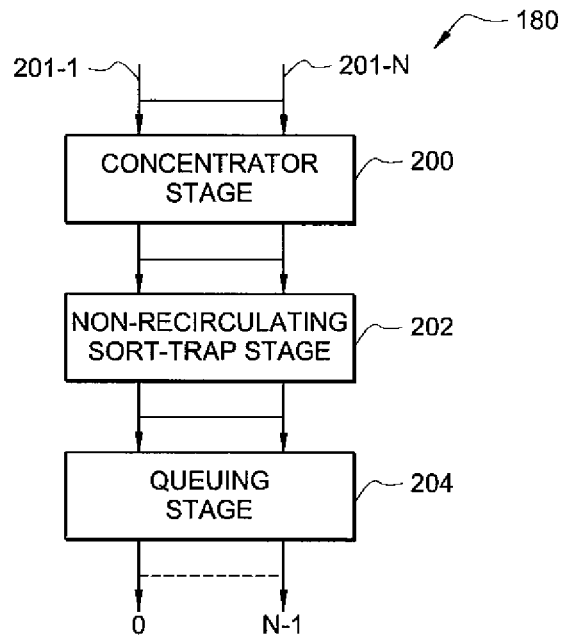
FIG. 3a is a block diagram of the ATM switching system of FIG. 2.

Referring next to FIG. 3a, the first ATM switching system 180 will now be described in greater detail. As may now be seen, the first ATM switching system 180 is comprised of a concentrator stage 200, a non-recirculating sort-trap stage 202 and a queuing stage 204. ATM cells entering the first ATM switching system 180 at input ports 201-1 through 201-N first enter the concentrator stage 200. A typical ATM cell similarly structured to those entering the concentrator stage 200 is set forth in Table I, below.

TABLE I

| CONTROL HEADER (5 BYTES) | DATA PAYLOAD (48 BYTES) |
| --- | --- |

For an ATM cell, control information is maintained in a header portion of the cell while data is maintained in a payload portion thereof. The control information maintained in the header includes a destination address to which the data payload is to be directed and a priority field which identifies the priority of a data payload destined to a particular destination address relative to other data payloads destined to the same destination address.

Within the concentrator stage 200, an N input to L output concentration is performed on the entering ATM cells. More specifically, if there are k cells arriving in a time slot for a given output, after passing through the concentrator stage 200, all k cells will emerge on outputs 1 to k, if, of course, $k \leq L$. In this manner, the concentrator stage 200 can reduce the size of the stages that follow, here, the non-recirculating sort-trap stage 208 and the queuing stage 202 by compacting all of the active input ports. If k>L, however, then all L outputs of the concentrator stage 200 will have cell thereon and k L cells will be dropped within the concentrator stage 200.

Figure 3B:
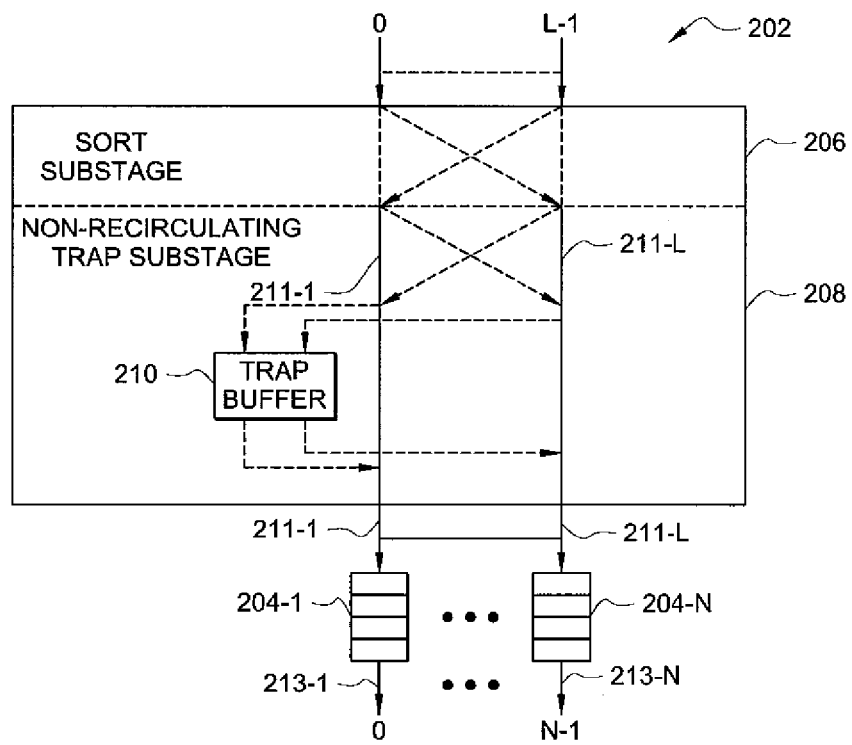
FIG. 3b is an expanded block diagram of a non-recirculating sort-trap stage of the ATM switching system of FIG. 2.

Referring next, in combination to FIGS. 3a and 3b, the cells exiting the concentrator stage 200 enter the non-recirculating sort-trap stage 202 for resolution of potential output port contentions. More specifically, cells entering the non-recirculating sort-trap network 202 in a time slot pass through, in sequence, a sort substage 206 and a non-recirculating trap substage 208. Within the sort substage 206, which, for example, may be a Batcher-type sorter network, the entering cells are sorted based upon their respective control headers and then arranged in ascending order of destination address. For cells having the same destination address, the priority field is used to sort cells destined to a common address. More specifically, a lower numerical value in the priority field is represented as a higher priority level. Thus, for an output line i, of the sort substage 206, cell addresses in the sorted list increase as i increases, and for identically addressed cells, cell priority decreases as i increases.

Once the cells are sorted based upon destination address and, for cells sharing a common destination address, priority, the cells continue to the non-recirculating trap substage 208. Within the non-recirculating trap substage 208, unique addresses are spotted by the trap circuitry (which typically includes a comparator array for spotting unique and non-unique addresses) and routed towards one side of the output lines, for example, towards output line 211-L while non-unique addresses are routed towards the other side of the output lines, for example, towards output line 211-1. As used herein, a cell is deemed to have a "unique" destination address if, for a given time slot, no other cell has the same destination address. If, for that same given time slot, plural cells share a common destination address, the cell having the common destination address and the highest priority among the plural cells is also deemed to have a "unique" destination address while those of the plural cells having the common destination address and a lower priority are deemed to have a "non-unique" destination address.

Accordingly, to separate the cells in accordance with the aforementioned definition of "unique" and "non-unique", the comparator array of the non-recirculating trap substage 208 are configured to pass each cell if the cell has a previously unencountered destination address but will flag each cell having a previously encountered destination address. While various techniques may be used to "flag" a cell, one suitable technique would be to select an unused control bit within the control header of the data cell and designate the selected bit as the non-unique destination address bit. Cells exiting the comparator array may then be separated into unique and non-unique groups by routing the cells having the selected control bit set towards one side of the non-recirculating trap substage 208 while routing the cells having the selected control bit unset towards the other side.

While the non-recirculating trap substage 208 separates cells having unique and non-unique destination addresses by identifying those cells having non-unique addresses and routing the identified cells towards one side of the non-recirculating trap substage 208, to minimize re-routing of cells within the non-recirculating trap substage 208, the prior sort of cells based upon destination address and priority is maintained within the separated groups of cells. If desired, the cells identified as having non-unique addresses may be discarded. Preferably, however, the cells identified as having non-unique addresses are temporarily stored in trap buffer 210 until a subsequent time slot and then released back onto the lines 211-1 through 211-L of the non-recirculating trap substage 208. Of course, to preserve sequencing of the trapped cells, cells are released according to their age. Thus, it is contemplated that one suitable configuration of the trap buffer 211 would be as a first-in-first-out ("FIFO") buffer. It is further contemplated that, to enhance throughput of the switching system 180 under various load conditions, the depth of the trap buffer 210 may be increased. However, it should be noted that, by increasing the depth of the trap buffer 210, the construction cost of the switching system 180 is also increased. As a result, in selecting the depth of the trap buffer 210, the enhanced performance of the switching system 180 should be weighed against the resultant increase in construction cost. Accordingly, hereinafter, the depth of the trap buffer 210 shall be identified as "M".

Finally, in various configurations thereof, the width of the trap buffer 210 may be varied between I and N. Widths less than L are generally less preferred since such configurations would require arbitration circuitry to handle time slots where L cells attempt to enter a lesser number of buffers. Thus, a more suitable width would be L. In such a configuration, each line 211-1 through 211-L would be coupled to a corresponding FIFO or other type of buffer. Again, however, since the L lines of the non-recirculating sort trap stage 202 were concentrated from the N input ports 201-1 through 201-N of the switching system 180, a drawback to configuring the trap buffer 210 to have a width of L is that, for a given line i, in a first time slot, the cell on that line may have a first destination address while, in a subsequent time slot, the cell on that line may have a second destination address. If so, various ones of the FIFOs or other buffers forming the trap buffer 210 may simultaneously hold cells having different destination addresses. As a result, the return of the trapped cells to the non-recirculating trap substage 210 would be much more complicated since the destination address of each returning cells may need to be determined to ensure proper routing thereof. Thus, in another alternate configuration, it is contemplated that the trap buffer 210 may have a width of N. For such a configuration, each cell re-routed to the trap buffer 210 would be placed in a selected one of the N FIFO or other type of buffers based upon the destination address for that cell. If multiple cells re-routed to the trap buffer 210 have the same destination address, the cells may all be placed in the same buffer, if desired, in order of priority.

It is contemplated that a variety of techniques may be used to release the trapped cells held in the trap buffer 210 back onto the lines 211-1 through 211-L of the non-recirculating trap substage 210. For example, if the trap buffer 210 is a FIFO buffer, the non-unique cells having a first destination address which are routed to the trap buffer 210 in a first time slot may simply be released onto the same lines 211-1 through 211-1 from which they were rerouted in a subsequent time slot related to the depth of the trap buffer. For example, if the depth of the trap buffer is 2, the non-unique cells having the first destination address would be released after two additional time slots have elapsed. While a non-recirculating trap substage 208 utilizing such a release technique would be quite easy to construct, it is generally considered less desirable because the released cells would still have to contend with the subsequent cells passing through the non-recirculating trap substage 210 for output ports of the switching system 180 and, while, in contrast to when the trap cells first entered the non-recirculating sort-trap stage, the likelihood of conflicting cells has been reduced, the likelihood of a conflicting cell being dropped within the non-recirculating trap substage 208 may still be too great.

In an alternate, generally more preferred, configuration thereof, a cell held in the trap buffer 210 may be released whenever it is determined, for a subsequent time slot, no cell shares the destination address with the cell to be released. Thus, a cell is placed into the trap buffer 210 if, for a first time slot, it has a non-unique destination address. That cell is then released in a subsequent time slot in which its destination address has become unique. Thus, cells having conflicting addresses are held in the trap buffer 210 until they are no longer conflicting. It is contemplated that a non-recirculating trap substage 208 utilizing such a release technique would likely require additional logic circuitry not shown in FIG. 3b. For example, logic circuitry which monitors: (1) which destination addresses are on the lines 211-1 through 211-N in each time slot and (2) for which destination addresses, are cells being held in the trap buffer 210. If the logic circuitry determines that a cell being held in the trap buffer 210 has a destination address that is not shared by any of the cells passing through the non-recirculating trap substage 208 in a subsequent time slot, the logic circuitry would then release, from the trap buffer 210, the cell having a unique destination address for the subsequent time slot.

In still another alternate configuration thereof, the cells held in the trap buffer 210 may simply be recycled, i.e., returned to a front end of the non-recirculating trap substage 208 to compete with cells in a subsequent time slot in the manner previously set forth. To enhance cell sequencing, the aged cells released from the buffer may have their priority reset to the highest possible priority so that, in the event that the released cell shares a destination address with a cell entering the non-recirculating trap substage 208 in a subsequent time slot, the aged cell will have a unique destination address and the younger cell will have a non-unique destination address and will be re-routed to the trap buffer 210. While such a configuration is suitable for the uses contemplated herein, one drawback to such a technique is that, by returning the released cells to the front end of the non-recirculating trap substage 208 for recycling, the speed of the non-recirculating trap substage 208 may be reduced.

Coupled to each output of the non-recirculating sort-trap network 202 is a corresponding output queue 204-1 through 204-N. As disclosed herein, each output queue 204-1 through 204-N is configured as a FIFO buffer. However, it is fully contemplated that various other buffer configurations not disclosed herein would be equally suitable for the uses contemplated herein. Cells exiting respective outputs of the non-recirculating trap substage 208 of the non-recirculating sort-trap network 202 enter a corresponding output queue 204-1 through 204-N. Thus, all of the cells entering a selected one of the output queues 204-1 through 204-N share the same destination address. The cells in each one of the output queues 204-1 through 204-N await their turn to access a corresponding output port 213-1 through 213-N coupled thereto from which the cells propagate to their destination address.

Figure 4:
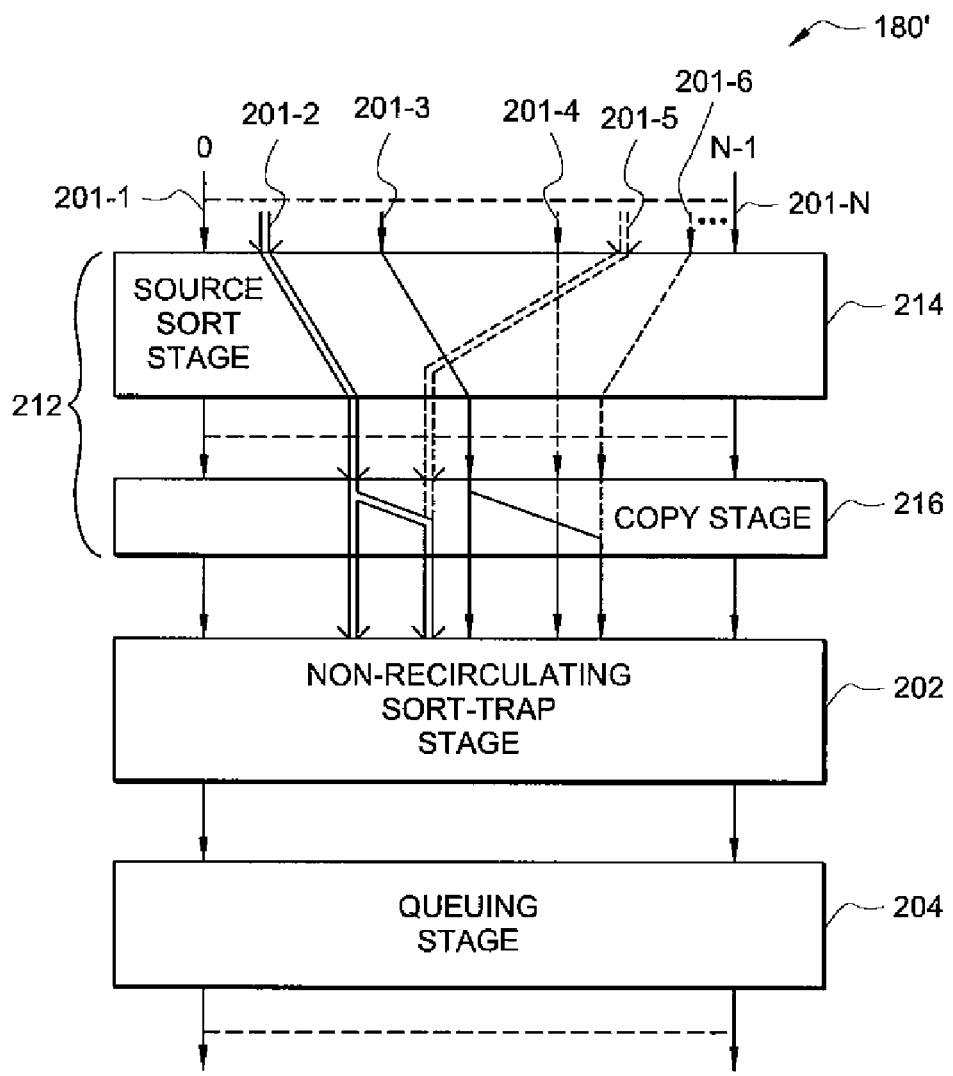
FIG. 4 is a block diagram of an alternate embodiment of the ATM switching system of FIG. 2 configured for multicast operations.

Referring to FIG. 4, an alternate embodiment of the switching system 180, hereafter referred to as switching system 180' will now be described in greater detail. As will be more fully described below, the switching system 180 has been modified, relative to the switching system 180, so that the switching system 180' may perform multi-casting functions. The switching system 180' differs from the switching system 180 in that the concentrator stage 200 has been removed and a broadcasting network 212 added. The broadcasting network 212 has an input side coupled to the input ports 201-1 through 201-N and an output side coupled to the input side of the non-recirculating sort-trap stage 202. If desired, however, a concentrator stage configured similarly to the concentrator stage 200 could be place between the input ports 201-1 through 201-N and the broadcasting network 212. By adding a concentrator stage in this manner, it is contemplated that idle sources and unused copy packet inputs may be eliminated before entering the broadcasting network 212.

As may be further seen in FIG. 4, the broadcasting network 212 is comprised of a source sort stage 214 and a copy stage 216. The source sort stage 214 has an input side coupled to the input ports 201-1 through 201-N and an output side coupled to an input side of the copy stage 216. The output side of the copy stage 216, on the other hand, is coupled to the input side of the non-recirculating sort-trap stage 202. Unlike the switching system 180, two types of data cells may arrive at the source sort stage 214 of the broadcasting network 212—source data cells and empty copy cells. Unlike the data cell illustrated in Table I, in addition to a destination address, the control header of the source data cells include a source address which indicates where the data cell originated. The control header of a source data cell also includes a copy bit which is set to "0" to indicate that the source data cell is an original cell.

Empty copy cells are automatically input the source sort stage by an empty copy cell generator (not shown). Typically, the empty copy cell generators are controlled by either users transmitting data to be multi-cast to multiple destinations or by a receiver interested in getting copies of data deemed suitable, by the source, for transmission to the receiver. Using a low bandwidth link to the input side of the source sort network 214, the empty copy cell generator generates empty copy cells having an empty data payload and a control header which contains the source address where the original data cell originated, a destination address for a recipient of a copy cell, and a copy bit set to "1" to indicate that the cell is a copy.

The source sort stage 214 sorts the data cells and empty copy cells based upon source address and, for plural cells sharing a common source address, copy bit, to order the entering cells such that their source addresses increase from left to right. Thusly, empty copy cells are grouped together with the corresponding data source cell on physical adjacent lines. For example, in FIG. 4, the cells entering on line 201-2 and 201-3 are source cells having respective source addresses. The cells on line 201-5 is an empty copy cell which shares a source address with the source cell on line 201-2 while the cells on lines 201-4 and 201-6 are empty copy cells which share a source address with the source cell on line 201-3.

Following the source sort stage 214 is an N by ($\log_2 N$) copy stage 216 which takes the information contained in the data payload for each entering source cell and copies that information into each entering empty copy cell sharing the source address. To perform this operation, the copy stage 216 searches the incoming cells for source cells. More specifically, starting on the leftmost input line thereinto, the copy stage examines the contents of the copy bit for each incoming cell. If the copy bit indicates that the incoming data cell is a source cell, the contents of the data payload is copied into the payload for the adjacent cell to the right of the source cell if the copy bit for the adjacent cell indicates that it is a copy cell. The copy stage 216 repeats this copy operation for each cell to the right of the source cell until a next source cell is encountered. The contents of the data payload for the next source cell is then copied into all copy cells adjacent thereto. Having filled all of the empty copy cells with data from the appropriate source cell, all of the data cells now contain the desired data. Accordingly, the data cells exit the broadcast network 212 and proceed to the non-recirculating sort-trap stage 202 for further handling in the manner previously described.

Thus, there has been described and illustrated herein, a relatively simple and inexpensive three-stage, non-recirculating switching system which enjoys enhanced throughput in contrast to other switching systems. However, those skilled in the art will recognize that numerous changes and modifications may be made in the switching system disclosed herein without departing from the spirit of the invention. Accordingly, the scope of the invention should be defined only be the appended claims.

The invention claimed is:

1. A switching system for a telecommunications network, comprising:
   a) a first stage having a plurality of input and two or more output sides, said output side concentrated relative to said input side;
   b) a second stage having input and output sides, said input side of said second stage coupled to output side of said first stage and said output side of said second stage being comprised of a plurality of outputs, wherein said second stage is a non-recirculating sort and trap stage that receives a plurality of cells having unique and non-unique destination addresses in a first time slot, wherein said second stage further comprises a sorter substage for arranging said plurality of cells arriving at said second stage in said first time slot in a first order, said first order based upon said destination address and a priority for each one of said plurality of cells; and
   c) a trap buffer coupled to said second stage, wherein said trap buffer comprises a number of first-in-first-out queues in a range between L first-in-first-out queues to N first-in-first-out queues, where N is the total number of said input sides of said first stage and L is the total number of said output sides of said first stage, wherein for a plurality of cells arriving, at said second stage, said second stage places each cell having a unique destination address on a selected one of said plurality of outputs at a next subsequent time slot, ages each cell having a non-unique destination address during subsequent sequential time slots until said destination address becomes unique, and discards the oldest said aged cell if said destination address does not become unique at a subsequent time slot.

2. The switching system of claim 1 wherein said first stage is a concentrator.

3. The switching system of claim 2 wherein said concentrator performs an N:L concentration on cells arriving in said first time slot.

4. The switching system of claim 1 wherein said sorter substage is a Batcher sorter.

5. The switching system of claim 1 wherein said second stage further comprises:
   a) a trap substage for placing each one of said arriving cells having a unique destination address on a selected one of said plurality of outputs and aging each one of said arriving cells having a non-unique destination address,
   b) wherein said trap substage places said aged cells on selected ones of said plurality of outputs in selected ones of a series of at least one subsequent time slots, said trap substage selecting said subsequent time slot for a selected aged cell when said destination address for said selected aged cell becomes unique for said selected subsequent time slot, and discards an aged cell if the destination address does not become unique at a subsequent time slot.

6. The switching system of claim 5 and further comprising:
   a) a third stage having an input side comprised of a plurality of inputs, each coupled to a corresponding one of said plurality of outputs of said second stage;
   b) wherein, in said first time slot and each one of said series of at least one subsequent time slots, said second stage placing a cell having a unique destination address on a selected one of said plurality of outputs.

7. The switching system of claim 6 wherein said third stage further comprises a queuing stage.

8. The switching system of claim 7 wherein said queuing stage further comprises a plurality of queues, each having an input coupled to a corresponding one of said plurality of outputs of said second stage and an output; each one of said plurality of queues buffering cells having a common destination address to be output said switching system.

9. A high performance broadband ATM switching system, comprising:
   a) a concentrator stage having a plurality of input ports for said switching system and a plurality of outputs, said concentrator concentrating cells entering said switch on said plurality of input ports onto said plurality of outputs by discarding idle ones of said plurality of inputs;
   b) a non-recirculating Batcher sorter trap stage having a plurality of inputs and a plurality of outputs, each of said plurality of inputs of said non-recirculating Batcher sorter trap stage coupled to a corresponding one of said plurality of outputs of said concentrator stage;
   c) a plurality of output queues, each one of said output queues having an input coupled to a corresponding one of said plurality of outputs of said non-recirculating Batcher sorter trap stage and an output port for said switching system, each one of said plurality of output queues buffering cells exiting said switching system which share a common destination address;
   d) said non-recirculating Batcher sorter trap stage places, during a selected one of a plurality of time slots, selected ones of a plurality of cells arriving thereat during a first one of said plurality of time slots onto a selected one of said outputs thereof if said selected ones of said plurality of cells has a unique destination address for said selected time slot, wherein said non-recirculating Batcher sorter trap stage further comprises a sorter substage for ordering said plurality of cells arriving at said second stage in each one of said plurality of time slots based upon said destination address and a priority for each one of said plurality of arriving cells; and
   e) said non-recirculating Batcher sorter trap stage further comprises a trap buffer, wherein said trap buffer comprises a number of first-in-first-out queues in a range between L first-in-first-out queues to N first-in-first-out queues, where N is the total number of said input ports of said concentrator stage and L is the total number of said outputs of said concentrator stage, wherein selected ones of said plurality of cells arriving thereat during said first one of said plurality of time slots is aged until a next subsequent one of said plurality of time slots and discarded if the destination address of the oldest one said aged cells does not become unique at a subsequent time slot.

10. The switching system of claim 9 wherein said non-recirculating Batcher sorter trap stage further comprises:
   a) a trap substage for placing, during each one of said plurality of time slots, each one of said plurality of cells having either a unique destination address or the highest priority among cells sharing a non-unique destination address on a selected one of said plurality of outputs, wherein for each one of said plurality of time slots, said trap substage selects cells for placement on said plurality of outputs from a set of cells comprised of cells arriving from said sorter substage during that one of said plurality of time slots and cells aged from the time slot immediately preceding that one of said plurality of time slots.

11. The switching system of claim 10 wherein said concentrator stage performs N:L concentrations on arriving cells wherein L is the number of connections to said second stage.

12. The switching system of claim 10 wherein said sorter substage is a Batcher sorter.

13. A multi-cast switching system, comprising:
   a) a broadcast network having a plurality of input and output sides, said broadcast network receiving, on said input side, a plurality of source cells from at least one source and a plurality of empty copy cells, said broadcast network copying data from selected ones of said plurality of source cells to selected ones of said empty copy cells to produce copies of said source cells;
   b) a non-recirculating Batcher sort-trap stage having input and output sides, said input side of said non-recirculating Batcher sort-trap stage coupled to said output side of said broadcast network for receiving said source cells and said copies of said source cells and said output side of said non-recirculating Batcher sort-trap stage being comprised of a plurality of outputs wherein said non-recirculating Batcher sort-trap stage further comprises a Batcher sorter substage for arranging said plurality of cells arriving at said second stage in said first time slot in a first order, said first order based upon a destination address and a priority for each one of said plurality of arriving cells, and wherein said non-recirculating Batcher stort-trap stage further comprises a trap substage wherein said trap substage comprises N first-in-first-out queues, where N is the number of said input sides of said broadcast network; and
   c) for a plurality of arriving cells, said non-recirculating Batcher sort-trap stage places, in a first time slot, each cell having a unique destination address on a selected one of said plurality of outputs of said Batcher sort-trap stage, ages each cell having a non-unique destination address for said first time slot at a next subsequent time slot in a buffer for storing not more than a predetermined number of cells in any one of said time slots, and discards the oldest of each said cells not having a unique destination address when said predetermined number of cells having a non-unique destination address have been stored in said buffer in during any of said time slots;
   d) wherein said plurality of arriving cells placed on the outputs of said Batcher sort-trap stage includes said source cells and said copies of said source cells.

14. The multi-cast switching system of claim 13 wherein said broadcast network further comprises:
   a) a source sort stage for sorting source and copy packets entering said source sort stage based upon a data source identifier for each one of said plurality of source packets and said plurality of copy packets; and
   b) a copy stage for copying data from source packets containing a first data source identifier to copy packets containing said first data source identifier.

15. The multi-cast switching system of claim 14 wherein said trap substage places each cell having said unique destination address on said selected one of said plurality of outputs and ages each cell having said non-unique destination address, and
   wherein, in a next time slot, said trap substage places said aged cells on selected ones of said plurality of outputs if said non-unique destination address for said aged cells becomes unique in said next time slot, and discards an aged cell if the destination address does not become unique at a subsequent time slot.

16. The multi-cast switching system of claim 15 wherein said sorter substage is a Batcher sorter.

17. The multi-cast switching system of claim 13 wherein said trap substage places each one of said arriving cells having a unique destination address on a selected one of said plurality of outputs and ages each one of said arriving cells having a non-unique destination address, and wherein said trap substage places said aged cells on selected ones of said plurality of outputs in selected ones of a series of at least one subsequent time slots when said destination address for said selected aged cell becomes unique, and discards said aged cell not having a unique destination address in a subsequent time slot.

18. The switching system of claim 5 and further comprising:
a) a third stage having an input side comprised of a plurality of inputs, each coupled to a corresponding one of said plurality of outputs of said second stage;
b) wherein, in said first time slot and each one of said series of at least one subsequent time slots, said second stage placing a cell having a unique destination address on a selected one of said plurality of outputs.

19. The switching system of claim 6 wherein said third stage further comprises a queuing stage.

20. The switching system of claim 7 wherein said queuing stage further comprises a plurality of queues, each having an input coupled to a corresponding one of said plurality of outputs of said second stage and an output; each one of said plurality of queues buffering cells having a common destination address to be output said switching system.

21. The switching system of claim 1 wherein each cell passes through the sorter substage and the trap substage only once.

22. The switching system of claim 1 wherein said second stage further comprises logic circuitry for:

a) monitoring said destination addresses of said plurality of cells arriving at said second stage;
b) monitoring said destination addresses of said cells in said buffer; and
c) placing said cells in said buffer on said selected one of said plurality of outputs if said cell address becomes unique during said next time slot.

23. The high performance broadband ATM switching system of claim 9 wherein said non-recirculating Batcher sorter trap stage further comprises logic circuitry for placing, during a selected one of said plurality of time slots, selected ones of said plurality of cells arriving thereat during said first one of said plurality of time slots onto said selected one of said outputs thereof if said selected ones of said plurality of cells have a unique destination address for said selected time slot.

24. The multi-cast switching system of claim 13 wherein said non-recirculating Batcher sort-trap stage further comprises logic circuitry for:

a) monitoring said destination addresses of said plurality of cells arriving at said second stage;
b) monitoring said destination addresses of said cells in said buffer; and
c) placing said cells in said buffer on said selected one of said plurality of outputs if said cell address becomes unique during said next time slot.

* * * * *